(12) United States Patent
Park et al.

(10) Patent No.: US 9,789,866 B2
(45) Date of Patent: Oct. 17, 2017

(54) APPARATUS AND METHOD FOR CONTROLLING MODE CHANGE OF HYBRID ELECTRIC VEHICLE

(71) Applicants: Hyundai Motor Company, Seoul (KR); Kia Motors Corporation, Seoul (KR)

(72) Inventors: Joonyoung Park, Seoul (KR); In Eok Cho, Incheon (KR); Jung Un An, Chungcheongbuk-do (KR); Hoon Han, Gyeonggi-do (KR); Dong Su Ha, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/852,578

(22) Filed: Sep. 13, 2015

(65) Prior Publication Data

US 2016/0362101 A1 Dec. 15, 2016

(30) Foreign Application Priority Data

Jun. 11, 2015 (KR) ........................ 10-2015-0082521

(51) Int. Cl.
*B60L 9/00* (2006.01)
*B60L 11/00* (2006.01)
(Continued)

(52) U.S. Cl.
CPC ............ *B60W 20/20* (2013.01); *B60W 10/02* (2013.01); *B60W 10/06* (2013.01); *B60W 10/08* (2013.01);
(Continued)

(58) Field of Classification Search
CPC ...... B60W 20/20; B60W 10/02; B60W 10/06; B60W 10/08; B60W 20/10; B60W 20/40
(Continued)

(56) References Cited

U.S. PATENT DOCUMENTS

| 2014/0114514 | A1 | 4/2014 | Crombez et al. |
| 2014/0288744 | A1 | 9/2014 | Endo et al. |
| 2015/0019061 | A1* | 1/2015 | Ueno ...................... B60K 6/48 701/22 |

FOREIGN PATENT DOCUMENTS

| DE | 102013222751 A1 | 12/2014 |
| JP | 2012-153320 A | 8/2012 |

(Continued)

OTHER PUBLICATIONS

European Search Report for European Patent Application No. 15185649.9, dated Nov. 10, 2016, 8 pages.

*Primary Examiner* — Maceeh Anwari
(74) *Attorney, Agent, or Firm* — Mintz Levin Cohn Ferris Glovsky and Popeo, P.C.; Peter F. Corless (57) ABSTRACT

An apparatus and a method are provided for controlling a mode change of a hybrid electric vehicle that change a mode of the hybrid electric vehicle at an optimal reference point of mode change when a demand power of a driver is stably maintained to be greater than a predetermined level. The method includes calculating a demand power or a demand torque of a driver and determining whether the demand power or the demand torque is maintained to be equal to or greater than a first predetermined value for a first predetermined time. A mode change hysteresis line is raised when the demand power or the demand torque is maintained to be equal to or greater than the first predetermined value for the first predetermined time and then a mode change is executed based on the raised mode change hysteresis line.

12 Claims, 7 Drawing Sheets

(51) Int. Cl.
    *G05D 1/00*     (2006.01)
    *G05D 3/00*     (2006.01)
    *G06F 7/00*     (2006.01)
    *G06F 17/00*     (2006.01)
    *B60W 20/20*     (2016.01)
    *B60W 50/06*     (2006.01)
    *B60W 20/00*     (2016.01)
    *B60W 20/10*     (2016.01)
    *B60W 10/02*     (2006.01)
    *B60W 10/06*     (2006.01)
    *B60W 10/08*     (2006.01)
    *B60W 20/40*     (2016.01)
    *B60K 6/48*     (2007.10)

(52) U.S. Cl.
    CPC ............ *B60W 20/00* (2013.01); *B60W 20/10* (2013.01); *B60W 20/40* (2013.01); *B60W 50/06* (2013.01); *B60K 6/48* (2013.01); *B60W 2510/0604* (2013.01); *B60W 2530/14* (2013.01); *B60W 2540/00* (2013.01); *B60W 2540/10* (2013.01); *B60W 2710/021* (2013.01); *B60W 2710/0666* (2013.01); *B60W 2710/083* (2013.01); *Y10S 903/93* (2013.01)

(58) Field of Classification Search
    USPC .......................................................... 701/22
    See application file for complete search history.

(56) References Cited

FOREIGN PATENT DOCUMENTS

| | | |
|---|---|---|
| JP | 2014-234133 A | 12/2014 |
| KR | 10-0957331 B1 | 5/2010 |
| KR | 10-2013-0017723 A | 2/2013 |
| KR | 10-2013-0074193 A | 7/2013 |
| WO | 2012/156127 A1 | 11/2012 |

\* cited by examiner

RELATED ART

FIG. 7

APPARATUS AND METHOD FOR CONTROLLING MODE CHANGE OF HYBRID ELECTRIC VEHICLE

CROSS-REFERENCE TO RELATED APPLICATION

This application claims priority to and the benefit of Korean Patent Application No. 10-2015-0082521 filed in the Korean Intellectual Property Office on Jun. 11, 2015, the entire contents of which are incorporated herein by reference.

BACKGROUND (a) Field of the Invention

The present invention relates to an apparatus and a method for controlling a mode change of a hybrid electric vehicle. More particularly, the present invention relates to an apparatus and a method for controlling a mode change of a hybrid electric vehicle that changes a mode of the hybrid electric vehicle at an optimal reference point of mode change when a demand power of a driver is stably maintained at greater than a predetermined level.

(b) Description of the Related Art

A hybrid vehicle is a type of vehicle that uses two or more different types of power sources and is generally driven by an engine that obtains a driving torque by burning fuel and a motor that obtains a driving torque with battery power. Hybrid electric vehicles are provided with optimum output torque, based on how the engine and the motor are operated while the vehicles are driven by the two power sources, that is, the engine and the motor.

The hybrid vehicle may be formed in various structures using an engine and an electric motor as a power source, and a transmission mounted electric device (TMED) type hybrid electric vehicle in which a motor is attached to a transmission and in which an engine clutch is inserted between the transmission and the engine may implement an electric vehicle (EV) mode and a hybrid electric vehicle (HEV) mode using disconnection and connection of the engine clutch.

In the TMED type hybrid electric vehicle, a driving mode is changed from the EV mode to the HEV mode when a demand power of a driver is increased. An optimal mode change reference point is determined by considering efficiency of an engine, a motor, and a battery. However, when the demand power of the driver fluctuates near the optimal mode change reference point, a mode change between the EV mode and the HEV mode is generated frequently. In the related art, to prevent a frequent mode change, a hysteresis line is applied to the mode change reference point due to the demand power of the driver. However, when the hysteresis line is applied to the mode change reference point, the demand power and demand power fluctuates, and increasing and decreasing. Thus, an inefficient operation of the engine may be generated.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling a mode change of a hybrid electric vehicle having advantages of changing a mode of the hybrid electric vehicle at an optimal reference point of mode change when a demand power of a driver is stably maintained at greater than a predetermined level.

An exemplary embodiment of the present invention provides a method for controlling a mode change of a hybrid electric vehicle that may include calculating a demand power or a demand torque of a driver; determining whether the demand power or the demand torque is maintained to be equal to or greater than a first predetermined value for a first predetermined time; raising a mode change hysteresis line when the demand power or the demand torque is maintained to be equal to or greater than the first predetermined value for the first predetermined time; and executing a mode change based on the raised mode change hysteresis line. The first predetermined value may be determined by adding a predetermined first threshold value to a mode change reference value. The raising the mode change hysteresis line may include raising an engine on reference line as much as a hysteresis width and an engine off reference line to the engine on reference line.

The method may further include, after raising the mode change hysteresis line, determining whether the demand power or the demand torque is maintained to be less than a second predetermined value for a second predetermined time; and lowering the mode change hysteresis line when the demand power or the demand torque is maintained to be less than the second predetermined value for the second predetermined time. The second predetermined value may be determined by subtracting a predetermined second threshold value from the mode change reference value. The lowering of the mode change hysteresis line may lower the engine on reference line as much as a hysteresis width and the engine off reference line as much as a hysteresis width.

Another exemplary embodiment of the present invention provides an apparatus for executing a mode change of a hybrid electric vehicle including an engine clutch selectively connecting an engine and a motor that may include a driving information detector configured to detect a current running state of the hybrid electric vehicle and a demand of a driver; and a controller configured to operate the engine clutch by calculating a demand power or a demand torque of the driver based on a signal from the driving information detector and adjusting a mode change hysteresis line based on the demand power or the demand torque.

The controller may be configured to raise (e.g., move upward) the mode change hysteresis line when the demand power or the demand torque is maintained to be equal to or greater than a first predetermined value for a first predetermined time. The controller may further be configured to determine the first predetermined value by adding a predetermined first threshold value to a mode change reference value. The controller may then be configured to raise an engine on reference line as much as a hysteresis width and an engine off reference line to the engine on reference line.

Further, the controller may be configured to lower the mode change hysteresis line when the demand power or the demand torque is maintained to be less than a second predetermined value for a second predetermined time, after raising the mode change hysteresis line. The controller may be configured to determine the second predetermined value by subtracting a predetermined second threshold value from the mode change reference value. The controller may then be configured to lower the engine on reference line as much as a hysteresis width and the engine off reference line as much as a hysteresis width.

As described above, according to an exemplary embodiment of the present invention, a mode change between the EV mode and the HEV mode may be generated at an optimal reference point, to prevent frequent change to the HEV mode. Therefore, fuel efficiency of the hybrid electric vehicle may be improved by reducing an inefficient operation of the engine.

BRIEF DESCRIPTION OF THE DRAWINGS

The drawings are for reference in describing an exemplary embodiment of the present invention, so that it shall not be construed that the technical spirit of the present invention is limited to the accompanying drawings.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention.

Although exemplary embodiment is described as using a plurality of units to perform the exemplary process, it is understood that the exemplary processes may also be performed by one or plurality of modules. The method described herein and the units may be operated by at least one controller. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
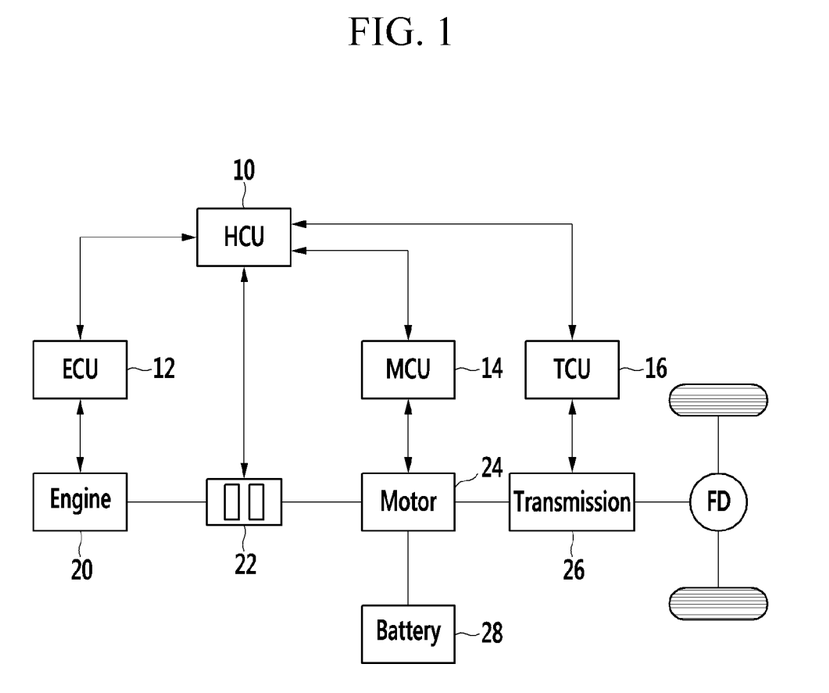
FIG. 1 is a diagram of a hybrid system to which a method for controlling a mode change of a hybrid electric vehicle is applied according to an exemplary embodiment of the present invention.

An exemplary embodiment of the present invention will hereinafter be described in detail with reference to the accompanying drawings. FIG. 1 is a diagram of a hybrid system to which a method for controlling a mode change of a hybrid electric vehicle is applied according to an exemplary embodiment of the present invention. The hybrid system as shown in FIG. 1 is an exemplary embodiment of the present invention for better comprehension and ease of description. Therefore, a method for controlling a mode change of a hybrid electric vehicle according to an exemplary embodiment of the present invention may not only be applied to the hybrid system as shown in FIG. 1, but may also be applied to all other hybrid systems.

As shown in FIG. 1, the hybrid system to which a method for adjusting torque reduction of a hybrid electric vehicle is applied according to an exemplary embodiment of the present invention may include a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

Particularly, the HCU 10 may be configured to operate the other controllers which mutually exchange information in an entire operation of a hybrid electric vehicle, so the HCU 10 may be configured to adjust output torque of the engine 20 and the motor 24 by cooperating with the other controllers. The ECU 12 may be configured to operate the engine 20 based on conditions of the engine 20, such as a demand torque of a driver, a coolant temperature, and an engine torque. The MCU 14 may be configured to operate the motor 24 based on a demand torque of a driver, a driving mode of the hybrid electric vehicle, and a state of charge (SOC) condition of the battery 28. The TCU 16 may be configured to operate the transmission 26 such as speed ratios of the transmission 26 based on output torque of the engine 20 and the motor 24, and an amount of regenerative braking.

The engine 20 may be configured to output power as a power source while turned on. Additionally, the engine clutch 22 may be disposed between the engine 20 and the motor 24 to receive a control signal of the HCU 10, and selectively connect the engine 20 and the motor 24 based on a driving mode of the hybrid electric vehicle. The motor 24 may be operated by a 3-phase alternating current (AC) voltage applied from the battery 28 via an inverter to generate torque, and may operate as a power generator and may be configured to supply regenerative energy to the battery 28 in a coast-down mode. The transmission 26 may be configured to supply a sum of an output torque of the engine 20 and an output torque of the motor 24 determined by coupling and releasing of the engine clutch 22 as an input torque, and select a shift gear based on a vehicle speed and a driving condition to output driving force to a driving wheel. The battery 28 may include a plurality of unit cells, and may be configured to store a high voltage for supplying a voltage to the motor 24, for example, about 400 V to 450 V DC. The hybrid system as described above is obvious to a person of ordinary skill in the art, so a detailed explanation thereof will be omitted.

Figure 2:
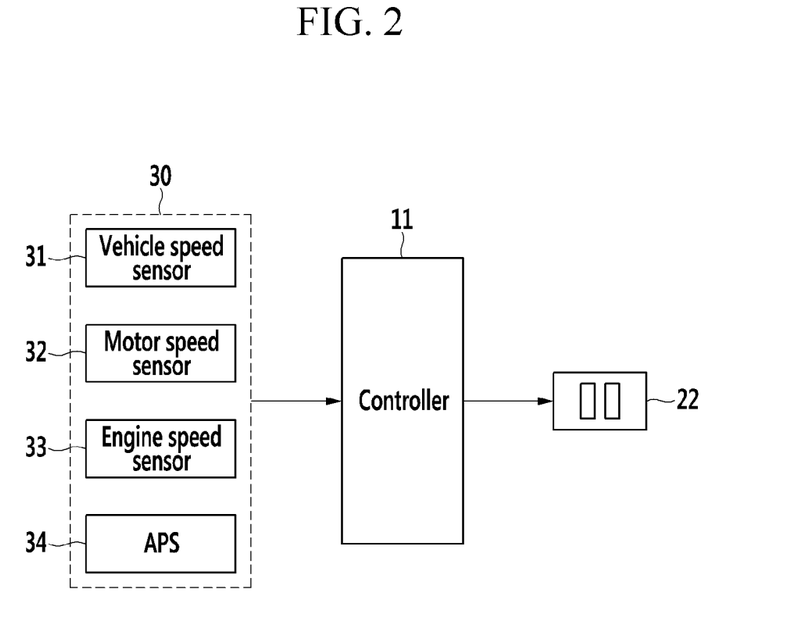
FIG. 2 is a block diagram of an apparatus for controlling a mode change of a hybrid electric vehicle according to an exemplary embodiment of the present invention.

FIG. 2 is a block diagram of an apparatus for controlling a mode change of a hybrid electric vehicle according to an exemplary embodiment of the present invention. As shown in FIG. 2, an apparatus for adjusting a mode change of a hybrid electric vehicle according to an exemplary embodiment of the present invention may include an engine clutch 22, a driving information detector 30, and a controller 11. Processes in the method for adjusting a mode change of the hybrid electric vehicle according to an exemplary embodiment of the present invention to be described below may be performed by integrating or subdividing due to each controller. Therefore, for convenience of description, in this specification and claims, many controllers disposed within the hybrid electric vehicle may be collectively referred to as the controller 11.

The hybrid electric vehicle to which an exemplary embodiment of the present invention is applied may include at least one engine 20 and at least one motor 24. In addition, the hybrid electric vehicle provides a driving mode in which the engine 20 and the motor 24 separately or simultaneously operate as a power source. For this purpose, the engine clutch 22 may be disposed between the engine 20 and the motor 24 to selectively connect the engine 20 and the motor 24. The driving information detector 30 of the hybrid electric vehicle may be configured to detect a demand of the driver and a current running state of the hybrid electric vehicle, and may include a vehicle speed sensor 31, a motor speed sensor 32, an engine speed sensor 33, and an accelerator pedal position sensor (APS) 34.

Further, the vehicle speed sensor 36 may be configured to detect a speed of the vehicle, and transmit a corresponding signal to the controller 11. The motor speed sensor 32 may be configured to detect a rotation speed of the motor 24, and transmit a corresponding signal to the controller 11. The engine speed sensor 33 may be configured to detect a rotation speed of the engine 20, and transmit a corresponding signal to the controller 11. The accelerator pedal position sensor 34 continuously may be configured to detect a position value of an accelerator pedal (e.g., an engagement degree) and transmit a monitoring signal to the controller 11. The position value of the accelerator pedal may be 100% when the accelerator pedal is fully engaged, and the position value of the accelerator pedal may be 0% when the accelerator pedal is disengaged (e.g., no pressure is applied to the pedal).

A throttle valve position sensor (TPS) mounted on an intake pipe may be used instead of the accelerator pedal position sensor 34. Therefore, in this specification and the scope of the appended claims, the accelerator pedal position sensor 34 may include the throttle valve position sensor, and the position value of the accelerator pedal may be understood to be an opening value of the throttle valve.

The controller 11 may be configured to calculate a demand power or a demand torque of the driver based on a signal from the driving information detector 30 and operate the engine clutch 22 by adjusting a mode change hysteresis line based on the demand power or the demand torque. The controller 11 may specifically be configured to raise the mode change hysteresis line when the demand power or the demand torque is maintained to be equal to or greater than a first predetermined value for a first predetermined time. That is, as seen in the figures, the mode change hysteresis line may be raised on the shown graph. Alternatively, as discussed below, the mode change hysteresis line may be lowered on the demand power axis (e.g., a horizontal line from the demand power axis).

Moreover, after raising the mode change hysteresis line, the controller 11 may be configured to lower the mode change hysteresis line when the demand power or the demand torque is maintained to be less than a second predetermined value for a second predetermined time. Accordingly, the controller 11 may be implemented as at least one processor that is operated by a predetermined program, and the predetermined program may be programmed to perform each step of a method for controlling a mode change of the hybrid electric vehicle according to an exemplary embodiment of the present invention.

Figure 3:
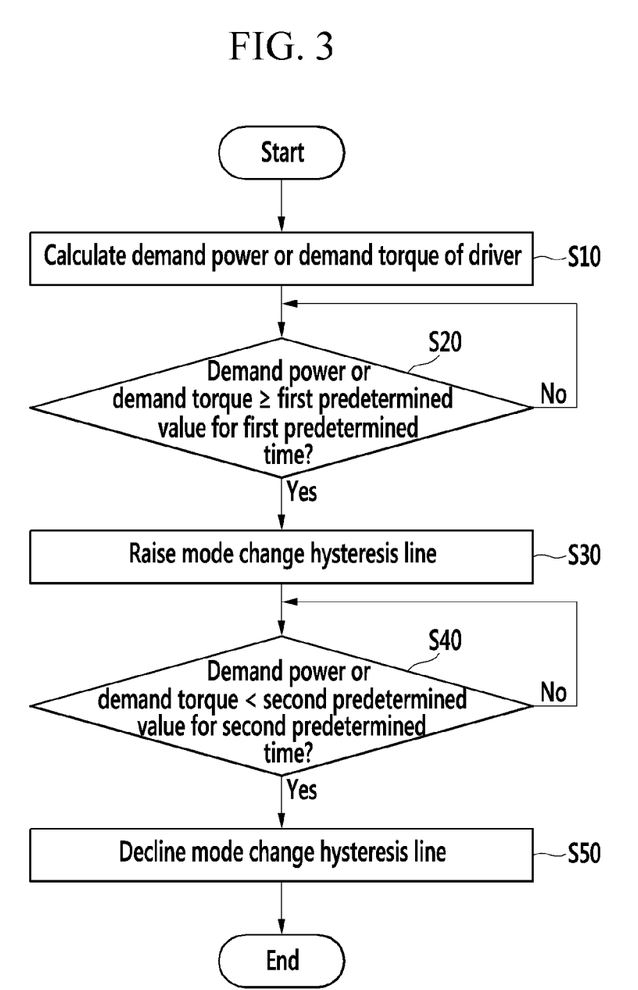
FIG. 3 is a flowchart showing a method for controlling a mode change of a hybrid electric vehicle according to an exemplary embodiment of the present invention.

Hereinafter, a method for executing a mode change of the hybrid electric vehicle according to an exemplary embodiment of the present invention will be described in detail with reference to FIG. 3 to FIG. 6. FIG. 3 is a flowchart showing a method for controlling a mode change of a hybrid electric vehicle according to an exemplary embodiment of the present invention.

As shown in FIG. 3, a method for controlling a mode change of a hybrid electric vehicle according to an exemplary embodiment of the present invention may include calculating, by a controller 11, a demand power or a demand torque of the driver based on a signal from the driving information detector 30 at step S10. When the demand power or the demand torque of the driver is calculated at the step S10, the controller 11 may be configured to determine whether the demand power or the demand torque is maintained to be equal to or greater than a first predetermined value for a first predetermined time at step S20.

When the demand power or the demand torque of the driver is maintained to be equal to or greater than the first predetermined value for the first predetermined time, it indicates that the demand power or the demand torque does not fluctuate and is in a substantially stable state. Herein, the first predetermined value may be determined by adding a predetermined first threshold value to a mode change reference value considering system efficiency. When the demand power or the demand torque of the driver is maintained to be equal to or greater than the first predetermined value for the first predetermined time at the step S20, the controller 11 may be configured to raise a mode change hysteresis line at step S30.

In particular, the controller 11 may be configured to raise an engine on reference line as much as a hysteresis width and an engine off reference line to the engine on reference line at the step S30. When the mode change hysteresis line is raised at the step S30, the controller 11 may be configured to determine whether the demand power or the demand torque is maintained to be less than a second predetermined value for a second predetermined time at step S40. When the demand power or the demand torque is maintained at less than the second predetermined value for the second predetermined time at the step S40, the controller 11 may be configured to lower the mode change hysteresis line at step S50.

The controller 11 may further be configured to restore the mode change hysteresis line to the original state (e.g., back to an original position) when the demand power or the demand torque of the driver is less than the second predetermined value. Herein, the second predetermined value may be determined by subtracting a predetermined second threshold value from the mode change reference value. In other words, the controller 11 may be configured to lower the engine on reference line as much as a hysteresis width and the engine off reference line as much as a hysteresis width at the step S50. Additionally, when the demand power or the demand torque is not maintained to be less than the second predetermined value for the second predetermined time at the step S40, the controller 11 may be configured to maintain the raised mode change hysteresis line.

Figure 4:
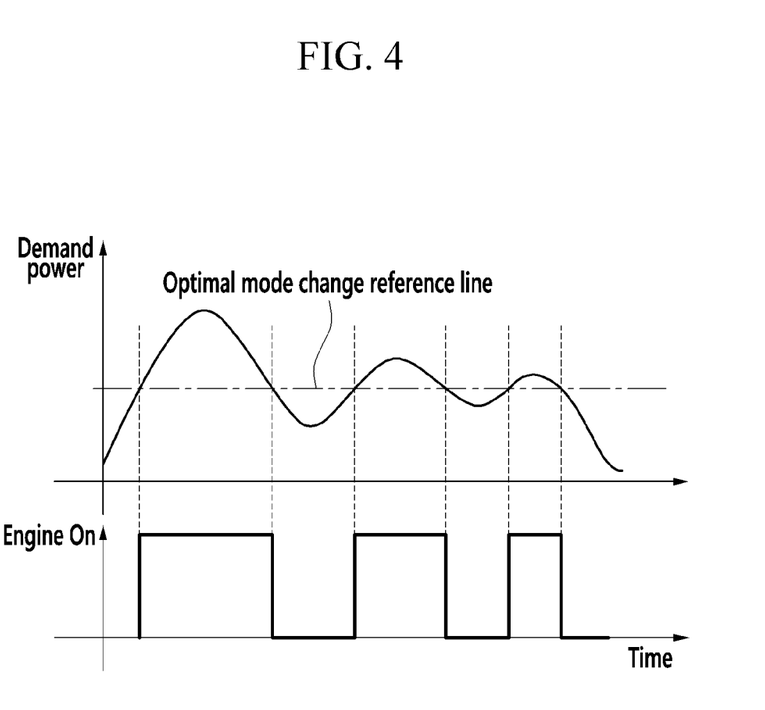
FIG. 4 is a diagram showing an engine on/off according to a demand power of a driver according to an exemplary embodiment of the present invention.
Figure 5:
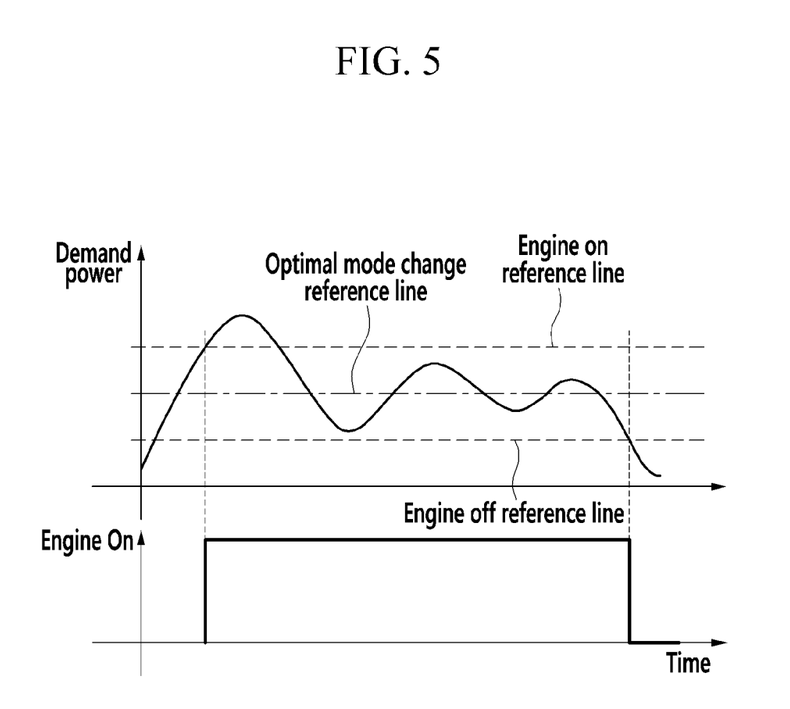
FIG. 5 is a diagram showing an engine on/off by applying a mode change hysteresis line when a demand power of a driver is fluctuating according to an exemplary embodiment of the present invention.

FIG. 4 is a diagram showing an engine on/off according to a demand power of a driver, and FIG. 5 is a diagram showing an engine on/off by applying a mode change hysteresis line when a demand power of a driver is fluctuating.

A driving mode of the hybrid electric vehicle may be changed based on a predetermined optimal mode change reference line. Thus, when the demand power of the driver is greater than or equal to the optimal mode change reference line, the engine may be turned on and the driving mode may be changed to HEV mode, on the contrary, when the demand power of the driver is less than the optimal mode change reference line, the engine may be turned off and the driving mode may be changed to EV mode. As shown in FIG. 4, when the demand power fluctuates, the engine may be repeatedly turned on or off and a frequent mode change may be generated.

Figure 6:
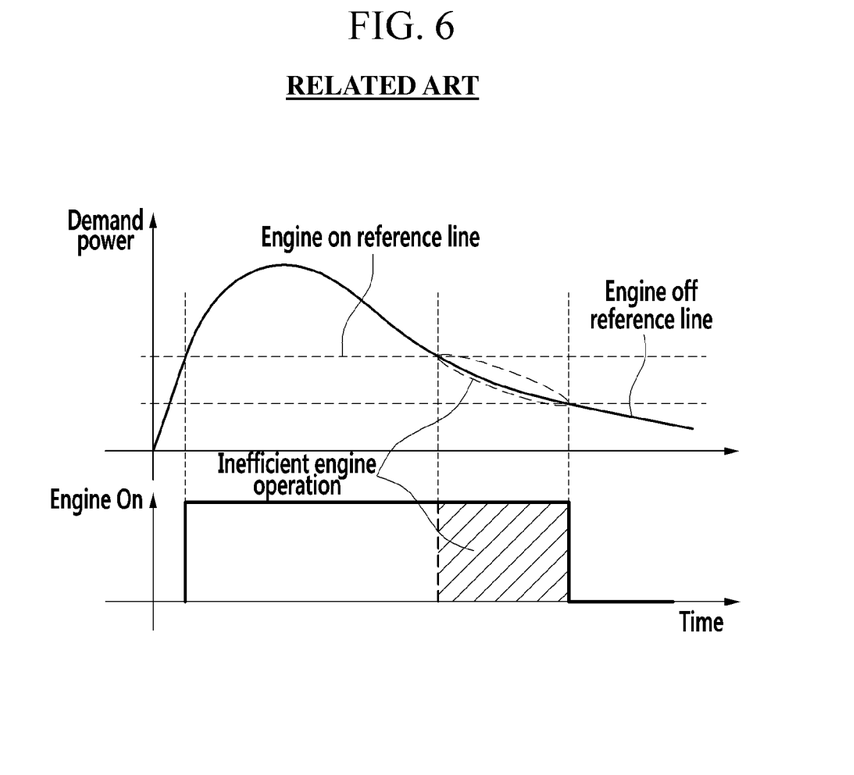
FIG. 6 is a diagram showing an engine on/off by applying a mode change hysteresis line according to a related art even though a demand power of a driver is stable.

Therefore, as shown in FIG. 5, the mode change hysteresis line may be applied to the hybrid electric vehicle, to determine the engine on reference line and the engine off reference line. Accordingly, when the demand power fluctuates between the engine on reference line and the engine off reference line, the hybrid electric vehicle may maintain the HEV mode. Meanwhile, the demand power of the driver which is stably raised and lowered is described in FIG. 6. FIG. 6 is a diagram showing an engine on/off by applying a mode change hysteresis line according to a related art even though a demand power of a driver is stable.

As shown in FIG. 6, the engine off reference line is lower than the optimal mode change reference line when the mode change hysteresis line according to a related art is applied, so the HEV mode may be maintained for a substantial period time. However, when the demand power is stable, the engine does not need to be turned on. Thus, the engine may be inefficiently operated in the HEV mode for a substantial period of time. To prevent an inefficient operation of the engine as described above, the mode change hysteresis line may be adjusted according to an exemplary embodiment of the present invention.

Figure 7:
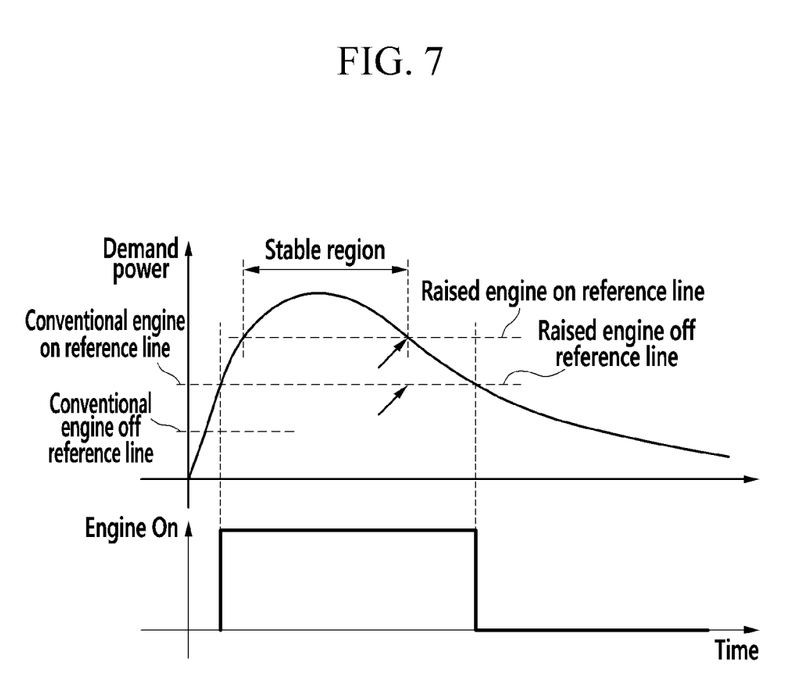
FIG. 7 a diagram showing an engine on/off by applying a raised mode change hysteresis line according to an exemplary embodiment of the present invention when a demand power of a driver is stable.

FIG. 7 is a diagram illustrating an engine on/off by applying a raised mode change hysteresis line according to an exemplary embodiment of the present invention when a demand power of a driver is stable. As shown in FIG. 7, when the mode change hysteresis line is raised according to an exemplary embodiment of the present invention, a conventional engine off reference line is raised to a conventional engine on reference line as much as a hysteresis width. Thus, the engine may be turned off earlier than in a related art. Therefore, the inefficient operation of the engine as described in FIG. 6 may be prevented.

As described above, according to an exemplary embodiment of the present invention, a mode change between the EV mode and the HEV mode may be generated at an optimal reference point to prevent frequent change to the HEV mode. Therefore, fuel efficiency of the hybrid electric vehicle may be improved by reducing an inefficient operation of the engine.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method for controlling a mode change of a hybrid electric vehicle, comprising:
    calculating, by a controller, a demand power or a demand torque of a driver;
    determining, by the controller, whether the demand power or the demand torque is maintained to be equal to or greater than a first predetermined value for a first predetermined time;
    raising, by the controller, a mode change hysteresis line when the demand power or the demand torque is maintained to be equal to or greater than the first predetermined value for the first predetermined time; and
    adjusting, by the controller, a mode change based on the raised mode change hysteresis line, wherein the raising of the mode change hysteresis line includes raising, by the controller, an engine on reference line as much as a hysteresis width and an engine off reference line toward the engine on reference line, and wherein if the determining step is satisfied, the raising step and the adjusting step are repeated.

2. The method of claim 1, wherein the first predetermined value is determined by adding a predetermined first threshold value to a mode change reference value.

3. The method of claim 1, further comprising after raising the mode change hysteresis line:
    determining, by the controller, whether the demand power or the demand torque is maintained to be less than a second predetermined value for a second predetermined time; and
    lowering, by the controller, the mode change hysteresis line when the demand power or the demand torque is maintained to be less than the second predetermined value for the second predetermined time.

4. The method of claim 3, wherein the second predetermined value is determined by subtracting a predetermined second threshold value from the mode change reference value.

5. The method of claim 3, wherein the lowering of the mode change hysteresis line includes:
   lowering, by the controller, the engine on reference line as much as a hysteresis width and the engine off reference line as much as a hysteresis width.

6. An apparatus for controlling a mode change of a hybrid electric vehicle including an engine clutch selectively connecting an engine and a motor, comprising:
   a driving information detector configured to detect a current running state of the hybrid electric vehicle and a demand of a driver; and
   a controller configured to operate the engine clutch by calculating a demand power or a demand torque of the driver based on a signal from the driving information detector and adjust a mode change hysteresis line based on the demand power or the demand torque,
   wherein the controller is configured to raise the mode change hysteresis line when the demand power or the demand torque is maintained to be equal to or greater than a first predetermined value for a first predetermined time, wherein the raising of the mode change hysteresis line includes raising an engine on reference line as much as a hysteresis width and an engine off reference line toward the engine on reference line, and
   wherein when the demand power or the demand torque is maintained to be equal to or greater than a first predetermined value for a first predetermined time, the raising step and the adjusting step are repeated.

7. The apparatus of claim 6, wherein the controller is configured to determine the first predetermined value by adding a predetermined first threshold value to a mode change reference value.

8. The apparatus of claim 6, wherein the controller is configured to lower the mode change hysteresis line when the demand power or the demand torque is maintained to be less than a second predetermined value for a second predetermined time, after raising the mode change hysteresis line.

9. The apparatus of claim 8, wherein the controller is configured to determine the second predetermined value by subtracting a predetermined second threshold value from the mode change reference value.

10. The apparatus of claim 8, wherein the controller is configured to lower the engine on reference line as much as a hysteresis width and the engine off reference line as much as a hysteresis width.

11. A non-transitory computer readable medium containing program instructions executed by a controller, the computer readable medium comprising:
    program instructions that detect a current running state of a hybrid electric vehicle including an engine clutch selectively connecting an engine and a motor and a demand of a driver;
    program instructions that operate the engine clutch by calculating a demand power or a demand torque of the driver based on a signal from the driving information detector and adjust a mode change hysteresis line based on the demand power or the demand torque; and
    program instructions that raise the mode change hysteresis line when the demand power or the demand torque is maintained to be equal to or greater than a first predetermined value for a first predetermined time, wherein the program instructions that raise the mode change hysteresis line include program instructions that raise an engine on reference line as much as a hysteresis width and an engine off reference line toward the engine on reference line, and
    wherein when the demand power or the demand torque is maintained to be equal to or greater than a first predetermined value for a first predetermined time, the raising step and the adjusting step are repeated.

12. The non-transitory computer readable medium of claim 11, further comprising:
    program instructions that lower the mode change hysteresis line when the demand power or the demand torque is maintained to be less than a second predetermined value for a second predetermined time, after raising the mode change hysteresis line.

* * * * *